US012151737B1

(12) United States Patent
Buzzard et al.

(10) Patent No.: US 12,151,737 B1
(45) Date of Patent: Nov. 26, 2024

(54) LOCKING MECHANISM FOR STEERING SYSTEM

(71) Applicant: Steering Solutions IP Holding Corporation, Saginaw, MI (US)

(72) Inventors: Donald A. Buzzard, Saginaw, MI (US); Michael P. Anspaugh, Bay City, MI (US); Floyd E. Eschenbacher, Freeland, MI (US); Matthew L. Messing, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/312,097

(22) Filed: May 4, 2023

(51) Int. Cl.
*B62D 1/184* (2006.01)
*B62D 1/19* (2006.01)

(52) U.S. Cl.
CPC .............. *B62D 1/184* (2013.01); *B62D 1/192* (2013.01)

(58) Field of Classification Search
CPC .................................. B62D 1/184; B62D 1/192
See application file for complete search history.

(56) References Cited

U.S. PATENT DOCUMENTS

| 10,023,222 | B2 * | 7/2018 | Tinnin | B62D 1/192 |
| 11,753,065 | B1 * | 9/2023 | Soderlind | B62D 1/181 |
| | | | | 74/493 |
| 11,891,111 | B1 * | 2/2024 | Buzzard | B62D 1/184 |
| 2015/0266499 | A1 * | 9/2015 | Yoshihara | B62D 1/184 |
| | | | | 74/493 |
| 2016/0144883 | A1 | 5/2016 | Vermeersch et al. | |
| 2018/0079443 | A1 | 3/2018 | Anspaugh et al. | |
| 2018/0362069 | A1 * | 12/2018 | Sugiura | B62D 1/184 |
| 2022/0266890 | A1 | 8/2022 | Buzzard et al. | |

FOREIGN PATENT DOCUMENTS

| EP | 3205558 A2 * | 8/2017 | ............. B62D 1/184 |
| EP | 3753806 A1 * | 12/2020 | ............... B62D 1/19 |
| JP | 2017171196 A * | 9/2017 | ............. B62D 1/184 |
| JP | 2019001281 A * | 1/2019 | ............. B62D 1/184 |
| KR | 20160050315 A * | 5/2016 | |

OTHER PUBLICATIONS

English translation of Office Action regarding corresponding DE App. No. 10 2023 110 331.8; issued Jan. 23, 2024.

* cited by examiner

*Primary Examiner* — Drew J Brown
(74) *Attorney, Agent, or Firm* — Dickinson Wright PLLC

(57) ABSTRACT

An axially adjustable steering column includes a first jacket. The steering column also includes a second jacket, wherein the first jacket is axially adjustable relative to the second jacket. The steering column further includes an adjustment lever. The steering column yet further includes a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket.

19 Claims, 7 Drawing Sheets

LOCKING MECHANISM FOR STEERING SYSTEM

TECHNICAL FIELD

The following description relates to vehicle steering systems, and more particularly, to a locking mechanism for such steering systems.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability. Many axially adjustable steering columns further include rake actuators that permit tilt movement around one or more pivot points.

In addition to providing adjustability, axially adjustable steering column assemblies may also include a collapsible functionality that provides safety advantages during an energy absorption event. A locking mechanism may be required to maintain a moveable portion of the steering column assembly at a desired position after axial adjustment. One type of commonly used locking mechanism in the automotive industry is called a telescoping positive lock mechanism. When designing a telescoping positive lock mechanism, attention is typically paid to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Accordingly, there is a continuing need to improve the operational framework of locking mechanisms to improve upon packaging, load requirements, and dependability.

SUMMARY

According to one aspect of the disclosure, an axially adjustable steering column includes a first jacket. The steering column also includes a second jacket, wherein the first jacket is axially adjustable relative to the second jacket. The steering column further includes an adjustment lever. The steering column yet further includes a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket.

According to another aspect of the disclosure, an axially adjustable steering column includes a first jacket. The steering column also includes a second jacket, wherein the first jacket is axially adjustable relative to the second jacket. The steering column further includes an adjustment lever. The steering column yet further includes a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket. The locking mechanism includes an energy absorbing strap defining a first plurality of receiving features and a second plurality of receiving features. The locking mechanism also includes a first cam having at least one tooth engageable with the first plurality of receiving features in the locked position and disengaged from the first plurality of receiving features in the unlocked position. The locking mechanism further includes a second cam having at least one tooth engageable with the second plurality of receiving features in the locked position and disengaged from the second plurality of receiving features in the unlocked position.

According to another aspect of the disclosure, a locking mechanism for a steering column assembly includes an energy absorbing strap defining a first series of teeth extending axially and a second series of teeth extending axially. The locking mechanism also includes a first cam having at least one tooth engageable with the first series of teeth in a locked position and disengaged from the first series of teeth in an unlocked position. The locking mechanism further includes a second cam having at least one tooth engageable with the second series of teeth in the locked position and disengaged from the second series of teeth in the unlocked position. The locking mechanism yet further includes a rocker coupled to the first cam, wherein the rocker and the first cam rotate with each other. The rocker includes a body portion. The rocker also includes a first leg extending from the body portion. The rocker further includes a second leg extending from the body portion. The rocker yet further includes a third leg extending from the body portion, wherein first leg defines a spacing receiving an arm extending from the first cam therein.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
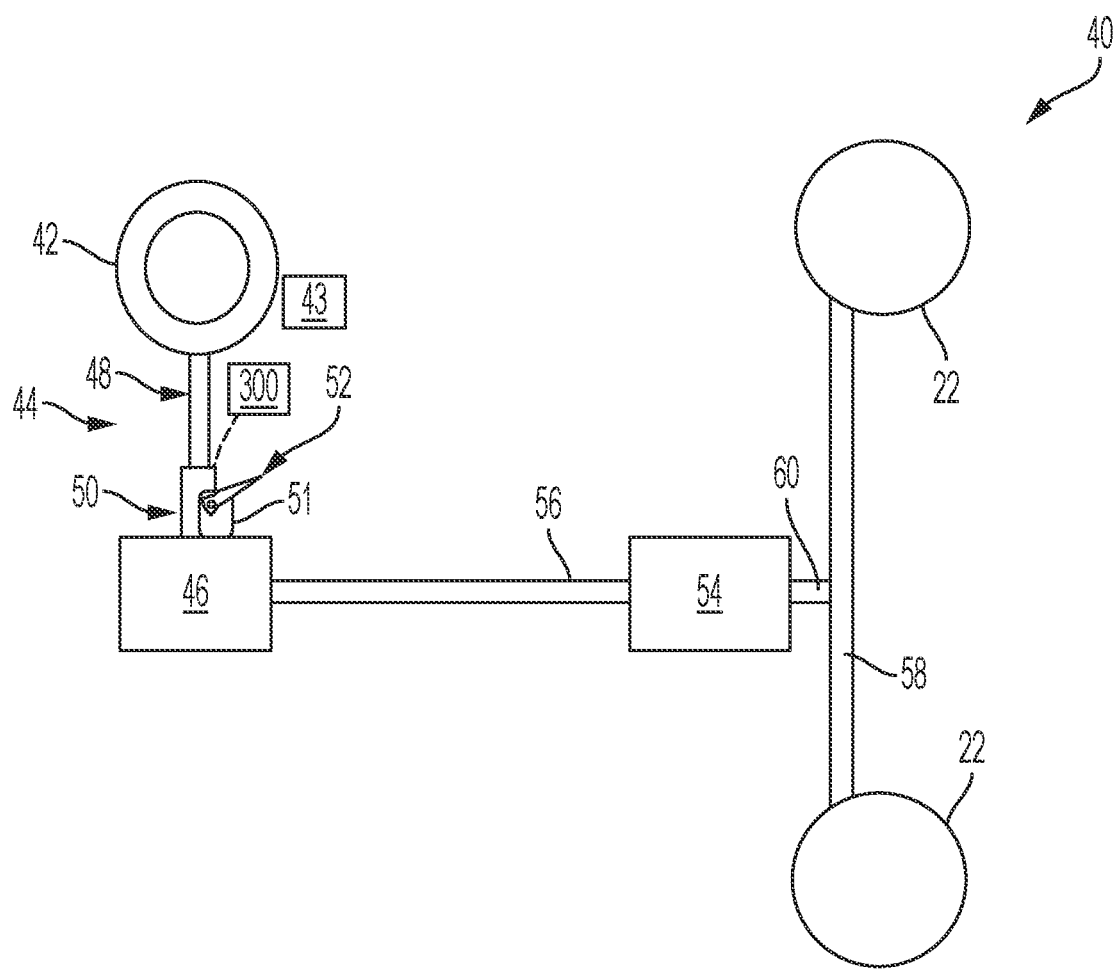
FIG. 1 schematically depicts a steering system including an adjustable steering column assembly.

The following discussion is directed to various embodiments of the disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring now to the drawings, where the various embodiments are shown and described herein, without limiting same, the Figures illustrate embodiments of a steering column assembly that is axially adjustable and includes a locking mechanism with improved dependability and other operational benefits. The axial adjustability can result from relative movement between two or more jackets that permit axial movement therebetween. For example, a first jacket and a second jacket move in a relative telescopic, sliding, or translational configuration.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a bracket 51 that at least partially connects the steering column to the vehicle 10. An adjustable lever 52 may be operably connected to one of the first jacket 48, the second jacket 50, or the bracket 51 to facilitate axial or tilting adjustment of the steering column assembly 44. In some embodiments, behavior of the adjustable lever 52 may be controlled via a control system 300 including a CPU unit. In some embodiments, behavior of the adjustable lever 52 may be controlled manually.

The steering column assembly 44 is moveable over a range of positions from an extended position to a retracted position. While it is contemplated that the second jacket 50 may be axially adjustable, the first jacket 48 is axially adjustable relative to the second jacket 50 to at least partially define the extended and retracted positions of the steering column assembly 44. For example, the first jacket 48 may be referred to as an "upper jacket" and the second jacket 50 may be referred to as a "lower jacket".

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 22. In other embodiments, the steering column assembly 44 is not directly mechanically connected to the steering gear assembly 54. Such an embodiment may be referred to as a steer-by-wire system.

Figure 2:
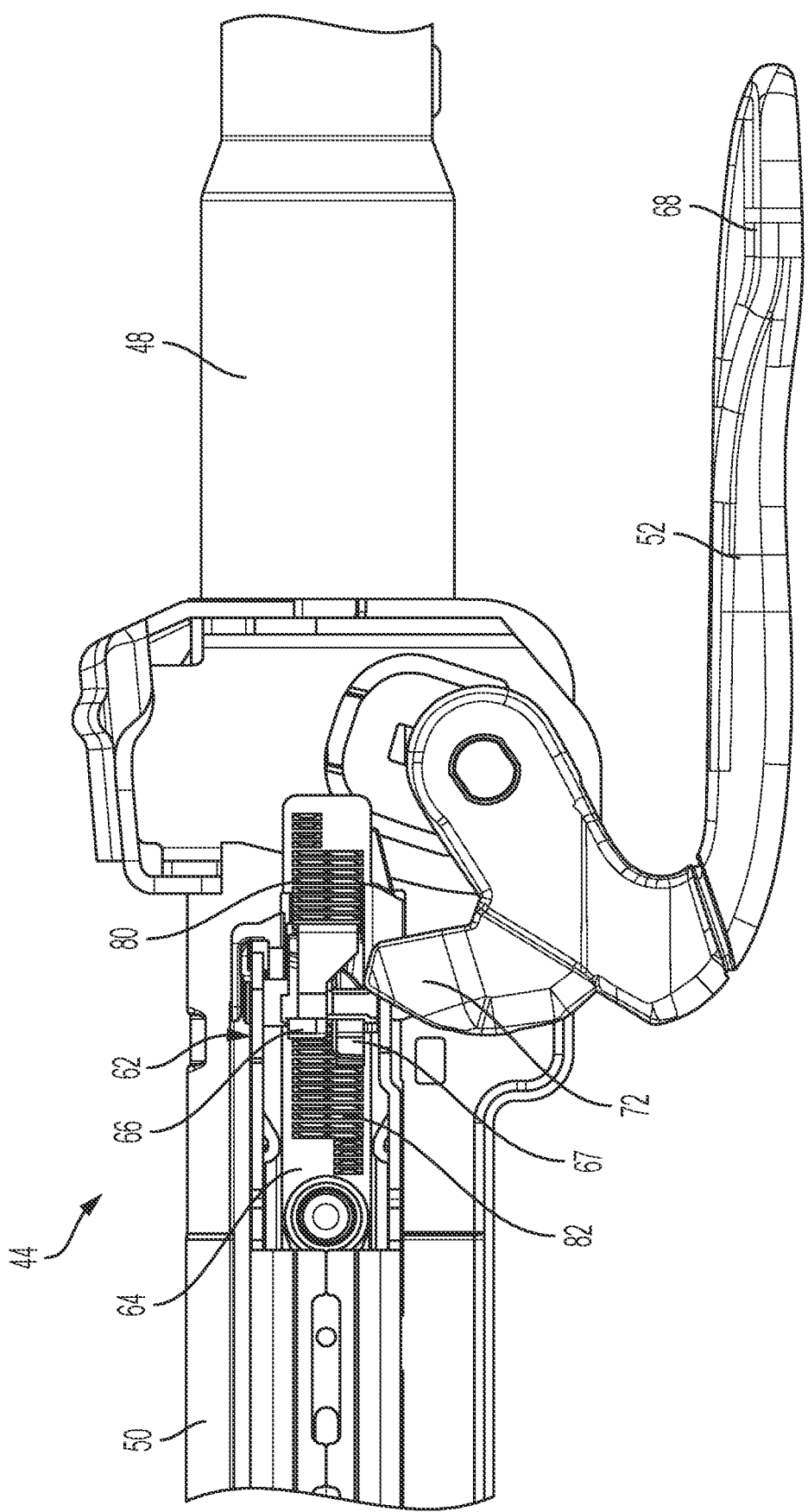
FIG. 2 is an elevation view of a portion of the adjustable steering column assembly illustrating a locking mechanism.
Figure 3:
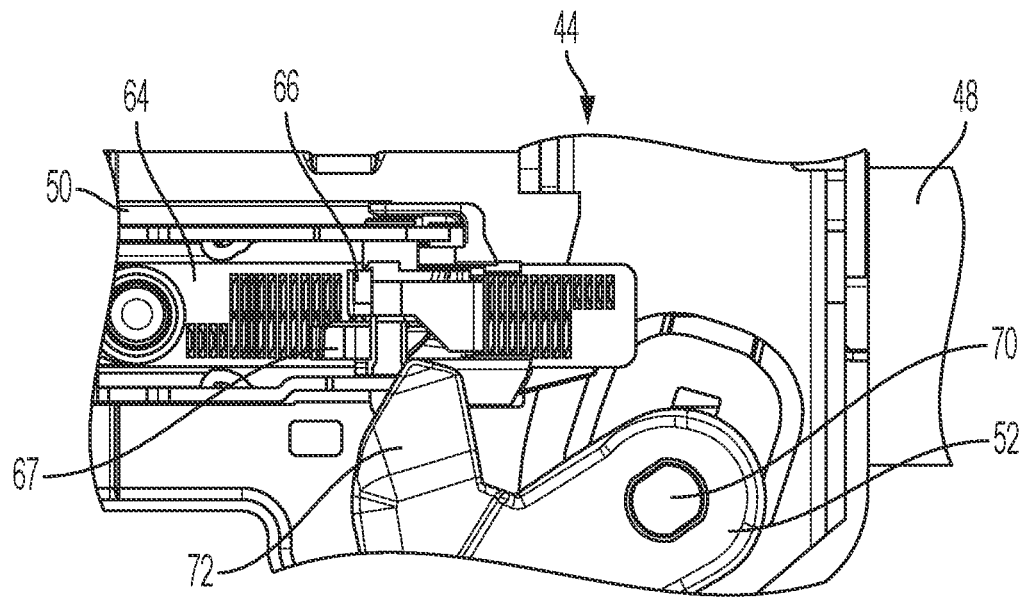
FIG. 3 is an elevation view of the locking mechanism in a locked position.
Figure 4:
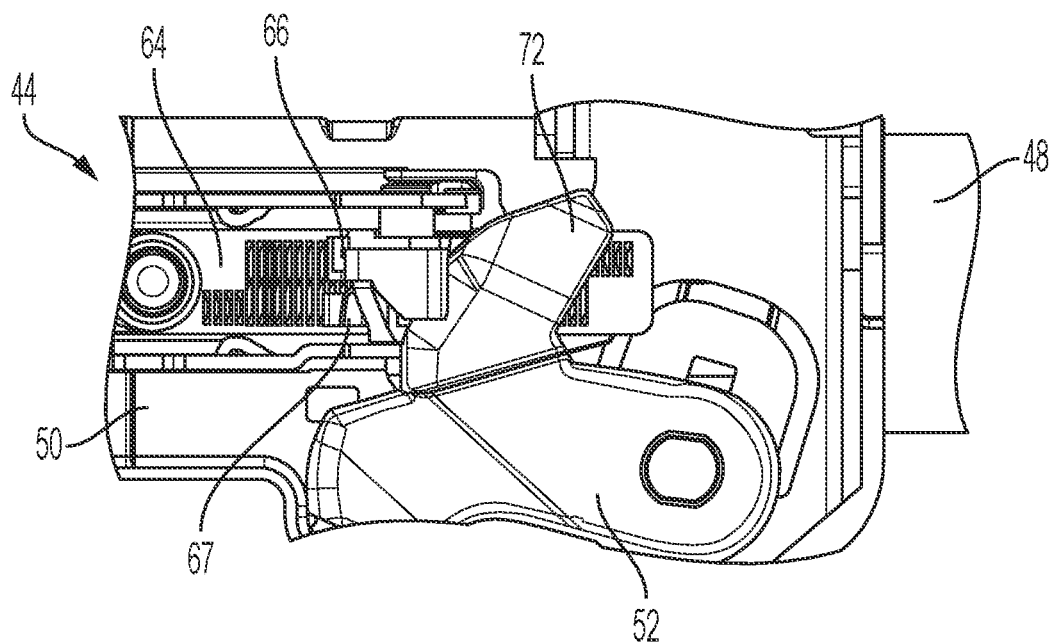
FIG. 4 is an elevation view of the locking mechanism in an unlocked position.
Figure 5:
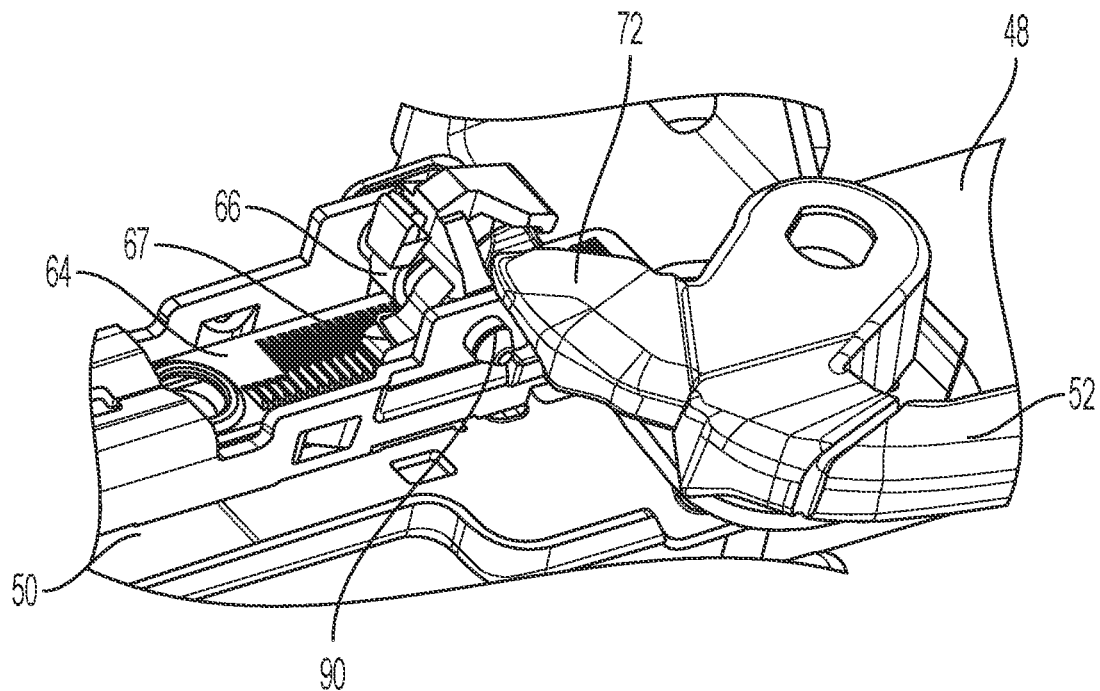
FIG. 5 is a perspective view of the locking mechanism in the locked position.
Figure 6:
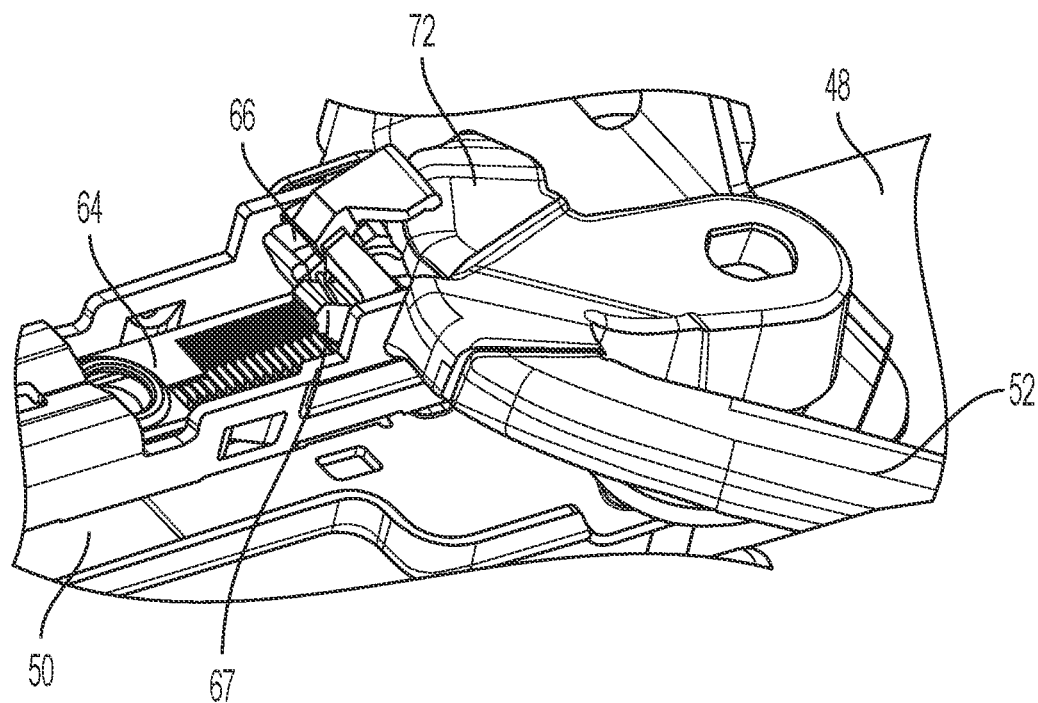
FIG. 6 is a perspective view of the locking mechanism in the unlocked position.
Figure 7:
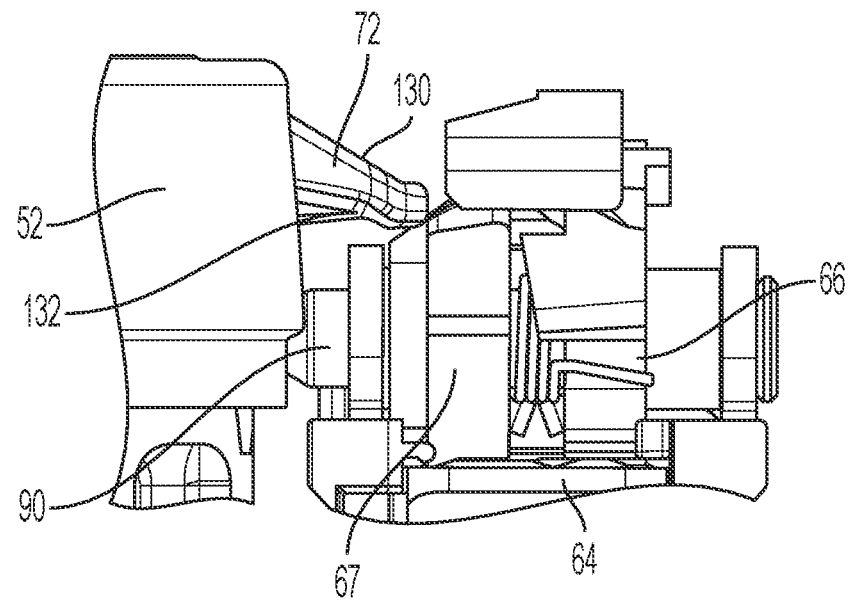
FIG. 7 is an end view of the locking mechanism in the locked position.
Figure 8:
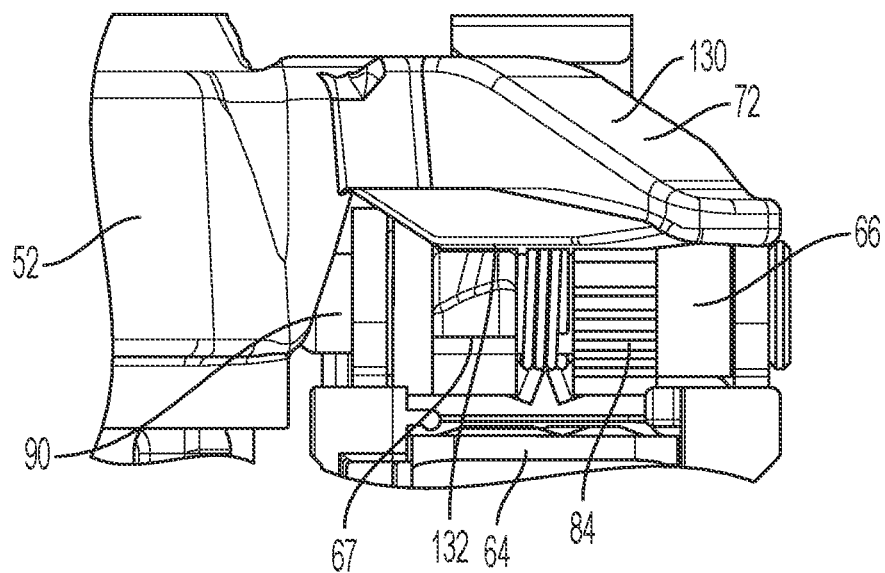
FIG. 8 is an end view of the locking mechanism in the unlocked position.
Figure 9:
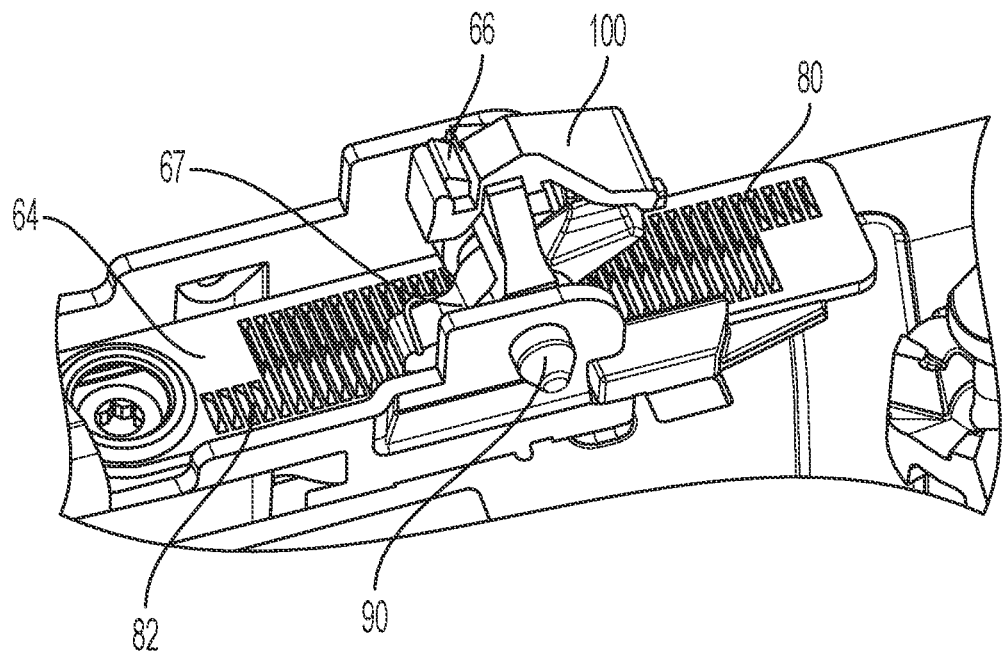
FIG. 9 is a perspective view of the locking mechanism in the locked position with a lever removed for additional clarity.
Figure 10:
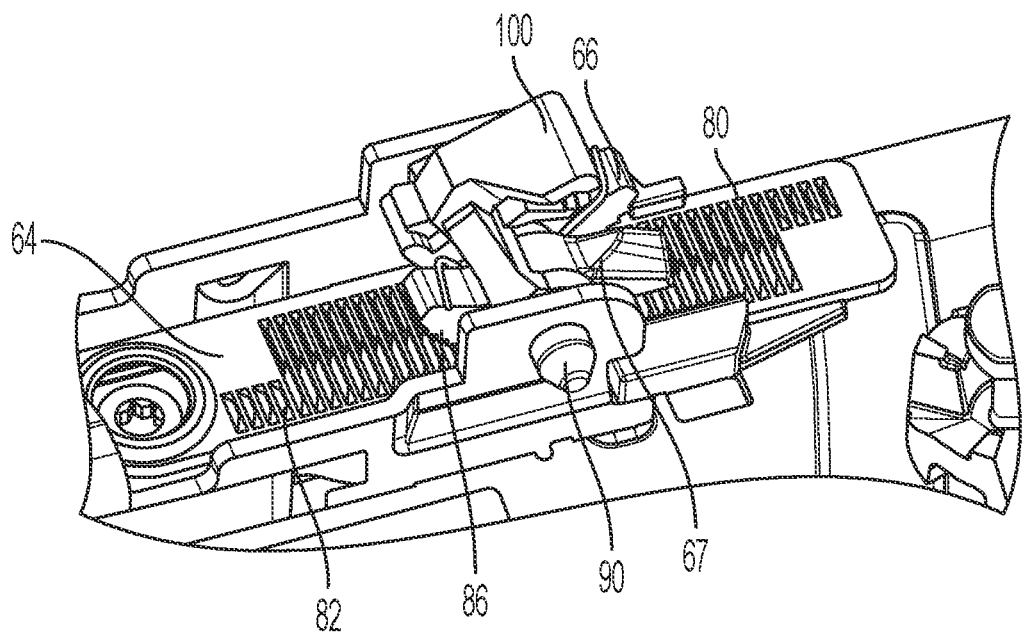
FIG. 10 is a perspective view of the locking mechanism in the unlocked position with a lever removed for additional clarity.

FIG. 2 generally illustrates the adjustable steering column assembly 44 with the adjustment lever 52 and a dual direction locking mechanism 62. The adjustable lever 52 includes a handle 68 and extends from a free end to a connection end which is connected to the steering column assembly 44. The adjustable lever 52 includes a paddle 72. The locking mechanism 62 includes an energy absorbing strap 64, a first cam 66, and a second cam 67. In a locked position of the locking mechanism 62 (FIGS. 2, 3, 5, 7, 9 and 11), the first cam 67 and the second cam 67 are engaged with the energy absorbing strap 64. Engagement between the cams 66, 67 and the energy absorbing strap 64 may be made with tooth-to-tooth contact, as illustrated and described herein, or in any other suitable manner. By way of a non-limiting alternative example, the locking engagement may be made with the teeth of the cams 66, 67 fitting within slots, other openings or recesses defined by the energy absorbing strap 64. By way of another non-limiting alternative example, the cams 66, 67 may define slots, other openings or recesses that receive teeth or other protrusions extending from the energy absorbing strap 64. In an unlocked position of the locking mechanism 62 (FIGS. 4, 6, 8, 10 and 12), the cams 66, 67 are spaced from the energy absorbing strap 64 to ensure disengagement.

The energy absorbing strap 64 defines a first series of teeth 80 and a second series of teeth 82. The first series of teeth 80 form a first axially extending track of teeth on the energy absorbing strap 64. The second series of teeth 82 form a second axially extending track of teeth on the energy absorbing strap 64. The term "axially extending" refers to a direction substantially parallel to the longitudinal axis of the steering column assembly 44. The teeth of the first series of teeth 80 are oriented at an angle that is different than an orientation angle of the second series of teeth 82 in some embodiments. While the angles are different in some embodiments, the first and second series of teeth 80, 82 may be differently sized or commonly sized. Alternatively, a single set of teeth may be utilized with a common tooth configuration in some embodiments. In other embodiments, the tooth profile on one or more of the cams 66, 67 and/or the series of teeth 80, 82 may be a rough surface with no distinctive tooth profile.

The first cam 66 defines a first tooth set 84 that is intermeshed with the first series of teeth 80 in the locked position. Similarly, the second cam 67 defines a second tooth set 86 that is intermeshed with the second series of teeth 82 in the locked position. It is to be understood that the first tooth set 84 and/or the second tooth set 86 is defined as one or more teeth. Therefore, a single tooth or a plurality of teeth may be referred to by the first tooth set 84 and/or the second tooth set 86.

Due to the first series of teeth 80 and the second series of teeth 82 being oriented at different angles, engagement of the first tooth set 84 of the first cam 66 and the first series of teeth 80 of the energy absorbing strap 64 provides locking in a first axial direction of the steering column assembly 44, while engagement of the second tooth set 86 of the second cam 67 and the second series of teeth 82 of the energy absorbing strap 64 provides locking in a second axial direction of the steering column assembly 44 that is opposite to the first axial direction. In other words, one of the cams 66 or 67 resists movement in a "telescope-in" direction of the first jacket 48, while the other of the cams 66 or 67 resists movement in a "telescope-out" direction of the first jacket 48. Therefore, the locking mechanism 62 is referred to as a dual direction locking mechanism that utilizes separate tracks of teeth.

Referring now to FIGS. 3-8, in operation, as the adjustable lever 52 is rotated from a locked position (FIGS. 3, 5 and 7), wherein the steering column assembly 44 cannot be adjusted, to an unlocked position (FIGS. 4, 6 and 8), wherein the steering column assembly 44 can be adjusted, the tab 72 contacts the cams 66, 67 and biases each of the cams 66, 67 out of engagement with the energy absorbing strap 64. As such, the adjustable lever 52 does not directly interface with the energy absorbing strap 64, but instead locks and unlocks the steering column assembly 44 with the cams 66, 67. In the unlocked position, movement of the steering column assembly 44 is permitted, where the upper jacket 48 may be movable relative to the lower jacket 50. The adjustment lever 52 pivots about an axis defined by a pin, bolt or the like 70 to move the locking mechanism 62 from the locked position to the unlocked position. The first and second cams 66, 67 are operatively coupled to the steering column assembly 44 with a pin, bolt or the like 90 which extends through holes defined by each of the cams 66, 67. The pin 90 may be coupled to the second jacket 50 in some embodiments and extends along an axis offset from the axis of the pin 70 which the adjustment lever 52 pivots about.

Figure 12:
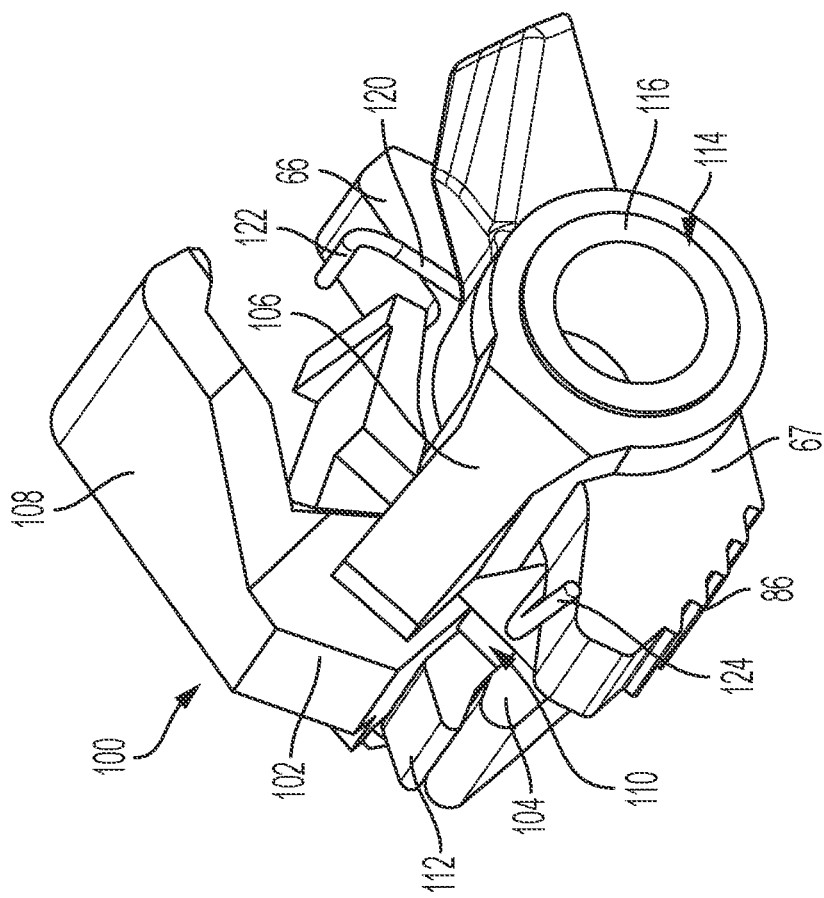
FIG. 12 is a perspective view of the first cam and the second cam of the locking mechanism in the unlocked position.
Figure 11:
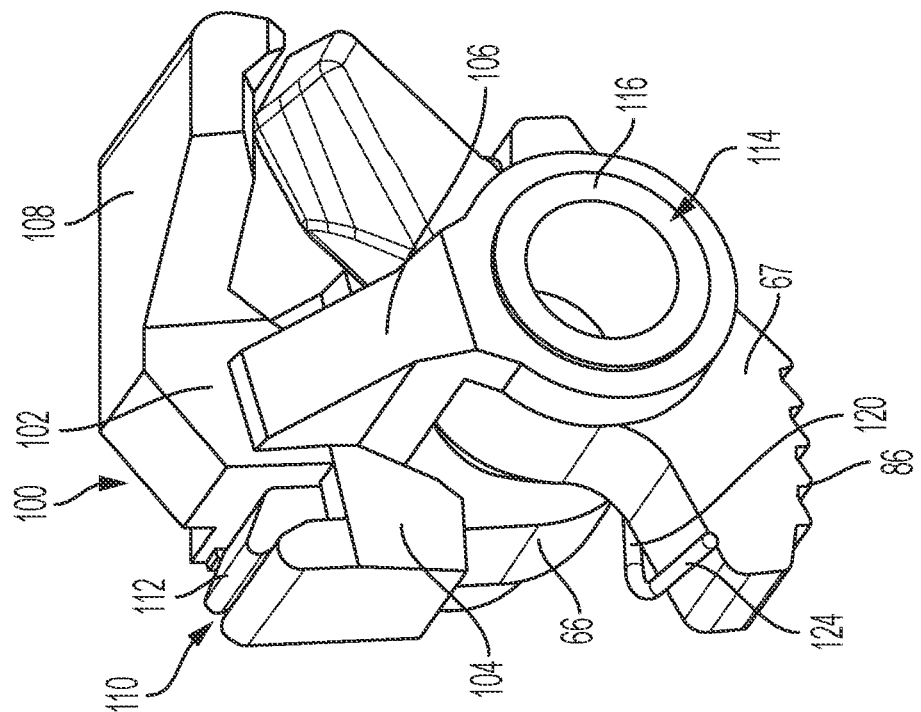
FIG. 11 is a perspective view of a first cam and a second cam of the locking mechanism in the locked position.

As shown in FIGS. 11 and 12, in addition to the above-described components, the locking mechanism 62 includes a rocker 100. The rocker 100 includes a body portion 102, a first leg 104 extending from the body portion 102, a second leg 106 extending from the body portion 102, and a third leg 108 extending from the body portion 102. The first leg 104 defines a spacing 110, such as a slot, which receives an arm 112 extending from the first cam 66 therein. Positioning of the arm 112 of the first cam 66 within the spacing 110 of the first leg 104 ensures that rotation of the rocker 100 results in corresponding rotation of the first cam 66. The second leg 106 of the rocker 100 defines a hole 114 for receiving a cylindrical flange 116 extending from the second cam 67.

The cylindrical geometry of the flange 116 and the hole 114 allows the rocker 100 and the second cam 67 to rotate relative to each other. The pin 90 extends through the hole 114 of the rocker 100, as well as through holes defined by the cams 66, 67.

In some embodiments, the rocker 100 is a separate component relative to the second cam 67, but in other embodiments the rocker 100 may be integrally formed with the second cam 67.

Referring to FIGS. 9-12, a biasing member 120, such as a torsion spring or a leaf spring, rotationally biases the cams 66, 67 toward the locked position of the locking mechanism 62. In particular, the biasing member 120 includes a first spring leg 122 in contact with the first cam 66 and a second spring leg 124 in contact with the second cam 67.

Referring again to FIGS. 3-8, with comparison views of the locked and unlocked positions, the paddle 72 of the adjustment lever 52 is shaped to contact and rotate the first cam 66 and the second cam 67 toward the unlocked position. The contour of the paddle 72 includes angling and/or curvature of the paddle surfaces which contact the first cam 66 and the second cam 67. In particular, a first surface 130 of the paddle 72 contacts an engagement surface of the third leg 108 of the first cam 66. Similarly, a second surface 132 of the paddle 72 contacts an engagement surface of the second cam 67. Contact and rotational movement of the adjustment lever 52 results in rotational movement of the cams 66, 67 in a manner that overcomes the spring force of the biasing member 120 to move the cams 66, 67 to the unlocked position.

In some embodiments, the first cam 66 and the second cam 67 are identically shaped components, while other embodiments utilize differently shaped cams. In some embodiments, the first cam 66 and the second cam 67 are formed of identical materials, while other embodiments utilize different materials.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An axially adjustable steering column comprising:
   a first jacket;
   a second jacket, wherein the first jacket is axially adjustable relative to the second jacket;
   an adjustment lever; and
   a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket, wherein the locking mechanism comprises:
   an energy absorbing strap defining a first series of teeth extending axially and a second series of teeth extending axially;
   a first cam having at least one tooth engageable with the first series of teeth in the locked position and disengaged from the first series of teeth in the unlocked position; and a second cam having at least one tooth engageable with the second series of teeth in the locked position and disengaged from the second series of teeth in the unlocked position.

2. The axially adjustable steering column of claim 1, wherein the first series of teeth and the second series of teeth are angled differently from each other.

3. The axially adjustable steering column of claim 1, wherein the locking mechanism further comprises a rocker coupled to the first cam, wherein the rocker and the first cam rotate with each other.

4. The axially adjustable steering column of claim 3, wherein the rocker comprises a body portion and a leg extending from the body portion, the leg defining an opening to receive an arm of the first cam to rotationally couple the rocker and the first cam.

5. The axially adjustable steering column of claim 3, wherein the adjustment lever includes a paddle, the paddle spaced from the locking mechanism in the locked position of the locking mechanism and in contact with the locking mechanism in the unlocked position.

6. The axially adjustable steering column of claim 5, wherein the paddle includes a first contact surface engageable with the first cam and a second contact surface engageable with the second cam, wherein the geometry of the first contact surface and the second contact surface rotationally bias the first cam and the second cam toward the unlocked position.

7. The axially adjustable steering column of claim 1, wherein the first cam and the second cam are rotationally biased toward the locked position with a biasing member in contact with the first cam and the second cam.

8. The axially adjustable steering column of claim 7, wherein the biasing member is one of a torsion spring and a leaf spring.

9. The axially adjustable steering column of claim 1, wherein the first cam and the second cam have identical geometries.

10. The axially adjustable steering column of claim 1, wherein the first cam and the second cam are formed of the same materials.

11. An axially adjustable steering column comprising:
a first jacket;
a second jacket, wherein the first jacket is axially adjustable relative to the second jacket;
an adjustment lever; and
a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket, wherein the locking mechanism comprises:
an energy absorbing strap defining a first plurality of receiving features and a second plurality of receiving features;
a first cam having at least one tooth engageable with the first plurality of receiving features in the locked position and disengaged from the first plurality of receiving features in the unlocked position; and
a second cam having at least one tooth engageable with the second plurality of receiving features in the locked position and disengaged from the second plurality of receiving features in the unlocked position.

12. The axially adjustable steering column of claim 11, wherein at least one of the first plurality of receiving features and the second plurality of receiving features comprises openings.

13. The axially adjustable steering column of claim 11, wherein at least one of the first plurality of receiving features and the second plurality of receiving features comprises recesses.

14. The axially adjustable steering column of claim 11, wherein the locking mechanism further comprises a rocker coupled to the first cam, wherein the rocker and the first cam rotate with each other.

15. The axially adjustable steering column of claim 11, wherein the adjustment lever includes a paddle, the paddle spaced from the locking mechanism in the locked position of the locking mechanism and in contact with the locking mechanism in the unlocked position.

16. The axially adjustable steering column of claim 11, wherein the first cam and the second cam are rotationally biased toward the locked position with a biasing member in contact with the first cam and the second cam.

17. The axially adjustable steering column of claim 16, wherein the biasing member is one of a torsion spring and a leaf spring.

18. A locking mechanism for a steering column assembly comprising:
an energy absorbing strap defining a first series of teeth extending axially and a second series of teeth extending axially;
a first cam having at least one tooth engageable with the first series of teeth in a locked position and disengaged from the first series of teeth in an unlocked position;
a second cam having at least one tooth engageable with the second series of teeth in the locked position and disengaged from the second series of teeth in the unlocked position; and
a rocker coupled to the first cam, wherein the rocker and the first cam rotate with each other, the rocker comprising:
a body portion;
a first leg extending from the body portion;
a second leg extending from the body portion; and
a third leg extending from the body portion, wherein first leg defines a spacing receiving an arm extending from the first cam therein.

19. The locking mechanism of claim 18, wherein the second leg of the rocker defines a hole for receiving a cylindrical flange extending from the second cam.

* * * * *